United States Patent
Sakai (10) Patent No.: US 10,811,682 B2
(45) Date of Patent: Oct. 20, 2020

(54) CATHODE ACTIVE MATERIAL, POSITIVE ELECTRODE FOR LITHIUM ION SECONDARY BATTERY AND LITHIUM ION SECONDARY BATTERY

(71) Applicant: SUMITOMO CHEMICAL COMPANY, LIMITED, Tokyo (JP)

(72) Inventor: Tomohiro Sakai, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 166 days.

(21) Appl. No.: 15/772,781

(22) PCT Filed: Nov. 9, 2016

(86) PCT No.: PCT/JP2016/083277
§ 371 (c)(1),
(2) Date: May 1, 2018

(87) PCT Pub. No.: WO2017/082313
PCT Pub. Date: May 18, 2017

(65) Prior Publication Data
US 2019/0252678 A1    Aug. 15, 2019

(30) Foreign Application Priority Data

Nov. 11, 2015   (JP) .................................. 2015-221439

(51) Int. Cl.
| | | |
|---|---|---|
| H01M 4/50 | (2010.01) |
| H01M 4/13 | (2010.01) |
| H01M 4/36 | (2006.01) |
| H01M 4/52 | (2010.01) |
| C01G 53/00 | (2006.01) |
| H01M 4/505 | (2010.01) |
| H01M 4/525 | (2010.01) |
| H01M 4/131 | (2010.01) |
| H01M 4/02 | (2006.01) |

(52) U.S. Cl.
CPC ............ *H01M 4/505* (2013.01); *C01G 53/00* (2013.01); *C01G 53/006* (2013.01); *C01G 53/44* (2013.01); *H01M 4/131* (2013.01); *H01M 4/36* (2013.01); *H01M 4/525* (2013.01); *C01P 2002/72* (2013.01); *C01P 2002/76* (2013.01); *C01P 2004/61* (2013.01); *C01P 2006/11* (2013.01); *C01P 2006/12* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2012/0217435 A1 | 8/2012 | Yamamoto et al. | |
| 2013/0327979 A1* | 12/2013 | Modeki | H01M 4/505 |
| | | | 252/182.1 |
| 2015/0060725 A1 | 3/2015 | Yamamoto et al. | |
| 2016/0043396 A1 | 2/2016 | Sakai et al. | |
| 2016/0056462 A1 | 2/2016 | Sakai et al. | |
| 2016/0218358 A1 | 7/2016 | Sakai et al. | |
| 2016/0218364 A1 | 7/2016 | Sakai et al. | |

FOREIGN PATENT DOCUMENTS

| | | |
|---|---|---|
| JP | 2011-096650 A | 5/2011 |
| JP | 2013-211239 A | 10/2013 |
| JP | 2016-136463 A | 7/2016 |
| JP | 2016-136464 A | 7/2016 |
| WO | 2012/111614 A1 | 8/2012 |
| WO | 2013/146287 A1 | 10/2013 |
| WO | 2014/192758 A1 | 12/2014 |
| WO | 2014/192759 A1 | 12/2014 |

OTHER PUBLICATIONS

Search Report issued in corresponding International Patent Application No. PCT/JP2016/083277, dated Dec. 27, 2016.
Translation of the International Preliminary Report on Patentability issued in corresponding International Patent Application No. PCT/JP2016/083277, dated May 24, 2018.
Japanese Notice of Reasons for Refusal issued in corresponding Japanese Patent Application No. 2017-550367, dated Aug. 18, 2020, with English translation.

* cited by examiner

*Primary Examiner* — Jonathan Crepeau
*Assistant Examiner* — Angela J Martin
(74) *Attorney, Agent, or Firm* — McDermott Will & Emery LLP (57) ABSTRACT

To provide a cathode active material capable of obtaining a lithium ion secondary battery which has a high discharge capacity and of which a decrease of the discharge capacity when a charge and discharge cycle is repeatedly carried out is suppressed, a positive electrode for a lithium ion secondary battery, and a lithium ion secondary battery. A cathode active material comprising a lithium-containing composite oxide represented by the formula $aLi(Li_{1/3}Mn_{2/3})O_2 \cdot (1-a)LiMO_2$ (wherein M is an element containing at least Ni and Mn, and $0<a<1$), wherein in an X-ray diffraction pattern, the integral breadth of a peak of (110) plane assigned to a crystal structure with space group C2/m is at most 1.25 deg.

11 Claims, 2 Drawing Sheets

CATHODE ACTIVE MATERIAL, POSITIVE ELECTRODE FOR LITHIUM ION SECONDARY BATTERY AND LITHIUM ION SECONDARY BATTERY

CROSS REFERENCE

This application is the U.S. National Phase under 35 U.S.C. § 371 of International Application No. PCT/JP2016/083277, filed on Nov. 9, 2016, which claims the benefit of Japanese Application No. 2015-221439, filed on Nov. 11, 2015, the entire contents of each are hereby incorporated by reference.

TECHNICAL FIELD

The present invention relates to a cathode active material, a positive electrode for a lithium ion secondary battery, and a lithium ion secondary battery.

BACKGROUND ART

As a cathode active material contained in a positive electrode of a lithium ion secondary battery, lithium cobaltate ($LiCoO_2$) has been commonly used. However, in recent years, for a lithium ion secondary battery for portable electronic instruments or for vehicles, downsizing and weight saving are required, and a further improvement in the discharge capacity of a lithium ion secondary battery per unit mass of the cathode active material (hereinafter sometimes referred to simply as the discharge capacity) is required.

In recent years, use of a solid solution type lithium-containing composite oxide of $Li_2MnO_3$ and $LiMO_2$ (wherein M essentially contains Mn and Ni and contains other transition metal as an optional component) as a material which can make the discharge capacity of a lithium ion secondary battery high, for a cathode active material is expected. A cathode active material comprising such a lithium-containing composite oxide is called a lithium rich cathode active material, and the following have been proposed.

(1) A cathode active material particle powder comprising a compound having at least a crystal system assigned to space group R-3m and a crystal system assigned to space group C2/m, wherein the compound is a composite oxide containing at least Li, Mn, boron, and Co and/or Ni, and in a powder X-ray diffraction pattern of the cathode active material particle powder employing Cu—Kα rays, the relative intensity ratio of the intensity (a) of the maximum diffraction peak at 2θ=20.8±1° to the intensity (b) of the maximum diffraction peak at 2θ=18.6±1° i.e. (a)/(b) is from 0.02 to 0.5, and the cathode active material particle powder has a Mn content by the molar ratio Mn/(Ni+Co+Mn) of at least 0.55, and contains boron in an amount of from 0.001 to 3 wt % (Patent Document 1).

(2) A cathode active material particle powder comprising a compound having at least a crystal system assigned to space group R-3m and a crystal system assigned to space group C2/m, wherein the compound is a composite oxide containing at least Li, Mn, element A (which is at least one element selected from Si, Zr and Y), and Co and/or Ni, and in a powder X-ray diffraction pattern of the cathode active material particle powder employing Cu—Kα rays, the relative intensity ratio of the intensity (a) of the maximum diffraction peak at 2θ=20.8±1° to the intensity (b) of the maximum diffraction peak at 2θ=18.6±1° i.e. (a)/(b) is from 0.02 to 0.2, and the cathode active material particle powder has a Mn content by the molar ratio (Mn/(Ni+Co+Mn)) of at least 0.55, contains the element A in an amount of from 0.03 to 5 wt %, has a tap density of from 0.8 to 2.4 g/cc, and has a compressed density of from 2.0 to 3.1 g/cc (Patent Document 2).

PRIOR ART DOCUMENTS

Patent Documents

Patent Document 1: JP-A-2011-096650
Patent Document 2: JP-A-2013-211239

DISCLOSURE OF INVENTION

Technical Problem

However, the lithium rich cathode active materials (1) and (2) are insufficient to suppress a decrease of the discharge capacity when a charge and discharge cycle is repeatedly carried out.

It is an object of the present invention to provide a cathode active material capable of obtaining a lithium ion secondary battery which has a high discharge capacity and of which a decrease of the discharge capacity when a charge and discharge cycle is repeatedly carried out is suppressed, a positive electrode for a lithium ion secondary battery, and a lithium ion secondary battery.

Solution to Problem

The cathode active material of the present invention (hereinafter sometimes referred to as the present active material) comprises a lithium-containing composite oxide represented by the formula $aLi(Li_{1/3}Mn_{2/3})O_2 \cdot (1-a)LiMO_2$ (wherein M is an element containing at least Ni and Mn, and $0<a<1$), wherein in an X-ray diffraction pattern, the integral breadth of a peak of (110) plane assigned to a crystal structure with space group C2/m is at most 1.25 deg.

The positive electrode for a lithium ion secondary battery of the present invention (hereinafter referred to as the present positive electrode) comprises the present active material, an electrically conductive material and a binder.

The lithium ion secondary battery of the present invention comprises the present positive electrode, a negative electrode, a separator and a non-aqueous electrolyte.

Advantageous Effects of Invention

According to the cathode active material of the present invention, it is possible to obtain a lithium ion secondary battery which has a high discharge capacity and of which a decrease of the discharge capacity when a charge and discharge cycle is repeatedly carried out is small.

According to the positive electrode for a lithium ion secondary battery of the present invention, it is possible to obtain a lithium ion secondary battery which has a high discharge capacity and of which a decrease of the discharge capacity when a charge and discharge cycle is repeatedly carried out is small.

Of the lithium ion secondary battery of the present invention, the discharge capacity is high, and a decrease of the discharge capacity when a charge and discharge cycle is repeatedly carried out is small.

DESCRIPTION OF EMBODIMENTS

In this specification, the expression "Li" means a Li element, not a Li metal simple substance, unless otherwise specified. The same applies to expressions of other elements such as Ni, Co and Mn.

In this specification, a precursor is a compound to be mixed with the lithium compound when the lithium-containing composite oxide is produced, and is a compound containing metals other than lithium to be contained in the lithium-containing composite oxide.

(Cathode Active Material)

The chemical composition of the lithium-containing composite oxide contained in the cathode active material is represented by the following formula 1.

$$aLi(Li_{1/3}Mn_{2/3})O_2\cdot(1-a)LiMO_2 \quad \text{Formula 1}$$

wherein "a" is more than 0 and less than 1, and m is an element containing at least Ni and Mn.

In the formula 1, when "a" is more than 0 and less than 1, the discharge capacity and the discharge voltage of the obtainable lithium ion secondary battery can be made high. "a" is preferably at least 0.15 and at most 0.78, more preferably at least 0.2 and at most 0.75.

In the formula 1, M is an element containing at least Ni and Mn. Further, M preferably contains Co and contains no Li. Further, M may contain an element other than Li, Ni, Co and Mn. Such other element may, for example, be F, P, Mg, Ca, Ba, Sr, Al, Cr, Fe, Ti, Zr, Y, Nb, Mo, Ta, W, Ce or La. With a view to making the discharge capacity of the lithium ion secondary battery high, other element contained in M is preferably at least one member selected from the group consisting of F, Mg, Al, Cr, Fe, Ti and Zr.

The chemical composition of the lithium-containing composite oxide contained in the cathode active material is preferably represented by the following formula 2.

$$aLi(Li_{1/3}Mn_{2/3})O_2\cdot(1-a)LiNi_\alpha Co_\beta Mn_\gamma M'_\delta O_2 \quad \text{Formula 2}$$

wherein "a" is more than 0 and less than 1, M' is the above-mentioned other element, and $\alpha+\beta+\gamma+\delta=1$.

In the formula 2, α is the molar ratio of Ni contained in the layered rock salt crystal structure. α is preferably 0 and less than 1. When α is within such a range, the discharge capacity and the discharge voltage of the obtainable lithium ion secondary battery can be made high. α is more preferably at least 0.36 and less than 1, still more preferably at least 0.40 and at most 0.83.

In the formula 2, β is the molar ratio of Co contained in the layered rock salt crystal structure. β is preferably 0 and less than 1. When β is within the above range, the rate characteristics of the of the lithium ion secondary battery can be made high. β is more preferably at least 0 and at most 0.33, still more preferably more than 0 and at most 0.1.

In the formula 2, γ is the molar ratio of Mn contained in the layered rock salt crystal structure. γ is preferably more than 0 and at most 0.5. When γ is within the above range, the discharge voltage and the discharge capacity of the lithium ion secondary battery can be made high. γ is more preferably at least 0.25 and at most 0.5, still more preferably at least 0.3 and at most 0.5.

In the formula 2, δ is the molar ratio of other element (M') contained in the layered rock salt crystal structure. δ is preferably at least 0 and at most 0.05. When δ is within the above range, the discharge capacity of the lithium ion secondary battery can be made high.

The ratio (Ni/X) of the molar amount of Ni to the total molar amount (X) of Ni, Co and Mn in the lithium-containing composite oxide is preferably from 0.15 to 0.55. When Ni/X is within the above range, the discharge capacity and the discharge voltage of the lithium ion secondary battery can be made higher. Further, with a view to making the discharge voltage of the lithium ion secondary battery higher, Ni/X is more preferably from 0.15 to 0.5, still more preferably from 0.2 to 0.4.

The ratio (Co/X) of the molar amount of Co to the total molar amount (X) of Ni, Co and Mn in the lithium-containing composite oxide is preferably from 0 to 0.09. When Co/X is within the above range, the rate characteristics of the lithium ion secondary battery can be made higher. Further, with a view to further reducing a decrease of the discharge capacity of the lithium ion secondary battery when a charge and discharge cycle is repeatedly carried out, that is, with a view to making the cycle characteristics of the lithium ion secondary battery more favorable, Co/X is more preferably from 0 to 0.07, still more preferably from 0 to 0.05.

The ratio (Mn/X) of the molar amount of Mn to the total molar amount (X) of Ni, Co and Mn in the lithium-containing composite oxide is preferably from 0.33 to 0.8. When Mn/X is within the above range, the discharge voltage and the discharge capacity of the lithium ion secondary battery can be made higher. Further, with a view to making the discharge voltage of the lithium ion secondary battery higher, the upper limit of Mn/X is more preferably 0.78. With a view to making the discharge capacity of the lithium ion secondary battery higher, the lower limit of Mn/X is more preferably 0.45, still more preferably 0.5.

The lithium-containing composite oxide contains $Li(Li_{1/3}Mn_{2/3})O_2$ (hereinafter referred to as C2/m phase) having a layered rock salt crystal structure with space group C2/m and $LiMO_2$ (wherein M is an element containing at least Ni and Mn) (hereinafter referred to as R-3m phase) having a layered rock salt crystal structure with space group R-3m.

The crystal structure of the lithium-containing composite oxide can be confirmed by X-ray diffraction measurement (XRD measurement). The X-ray diffraction measurement is conducted by the method under the conditions as disclosed in Examples. In an X-ray diffraction pattern, as peaks assigned to space group R-3m, a peak corresponding to (003) plane appears at 2θ=18 deg to 20 deg, a peak corresponding to (020) plane appears at 2θ=20 deg to 21 deg, a peak corresponding to (110) plane appears at 2θ=21 deg to 22 deg.

Of the lithium-containing composite oxide, in the X-ray diffraction pattern, the integral breadth of a peak of (110) plane assigned to a crystal structure with space group C2/m is at most 1.25 deg. The integral breadth being at most 1.25 deg is considered to indicate a high crystallinity of the C2/m phase in the lithium-containing composite oxide. Accordingly, by using a cathode active material containing such a lithium-containing composite oxide, the cycle characteristics of the obtainable lithium ion secondary battery will be high. The integral breadth is more preferably at most 1.2 deg, still more preferably at most 1.18. Although the lower limit is not particularly limited, it is preferably at least 0.4 deg, more preferably more than 0.45 deg. The integral breadth is the width when the peak of (110) plane in the X-ray diffraction pattern is calculated to a rectangle with the same area and height.

It is preferred that of the lithium-containing composite oxide, in the X-ray diffraction pattern, there is a minimum value between a peak of (020) plane and a peak of (110) plane assigned to a crystal structure with space group C2/m. And, the ratio of the peak intensity of the minimum value to the peak (maximum value) of (110) plane assigned to the crystal structure with space group C2/m (i.e. minimum value/maximum value) is preferably at most 0.56. The minimum value/maximum value ratio is preferably at least 0.001, more preferably from 0.001 to 0.52, still more preferably from 0.01 to 0.48.

When the ratio (minimum value/maximum value) of the peak intensity is at most 0.56, the peak of (110) plane of the crystal structure with space group C2/m is steep. That is, it is considered that distortion of periodicity of (110) plane of the crystal structure with space group C2/m will be small, and the crystal structure will be stabilized. When the crystal structure of the C2/m phase is as mentioned above, it is considered that the crystal structure of the entire lithium-containing composite oxide will be stably maintained by the reaction of withdrawal and introduction of lithium. As a result, it is considered that a decrease of the capacity is less likely to occur even when a charge and discharge cycle is repeatedly carried out, and the present active material can make the cycle characteristics of the lithium ion secondary battery higher as compared with a conventional cathode active material. On the other hand, the ratio of the peak intensity is preferably at least 0.001, whereby a high discharge capacity will readily be obtained.

In this specification, the minimum value and the maximum value are values calculated by removing the background and Kα2 in the X-ray diffraction pattern, followed by smoothing. The method is described in Examples as an example.

The distortion of the periodicity of the C2/m phase of the lithium-containing composite oxide being small, can be confirmed also by observation with a TEM (transmission electron microscope) or by electron diffraction. By observation with a TEM of the domains of the C2/m phase, a layered structure with distances between layers being substantially constant can be confirmed when the distortion of the periodicity of the C2/m phase is small. Further, when the distortion of the periodicity of the C2/m phase is small, electron diffraction spots (bright spots) assigned only to the C2/m phase of the lithium-containing composite oxide are clearly distinct from one another.

In the X-ray diffraction pattern of the lithium-containing composite oxide, the ratio of the height ($H_{110}$) of a peak of (110) plane assigned to a crystal structure with space group C2/m to the height ($H_{003}$) of a peak of (003) plane assigned to a crystal structure with space group R-3m (i.e. $H_{110}/H_{003}$) is preferably from 0.06 to 0.15. A lithium-containing composite oxide wherein $H_{110}/H_{003}$ is within the above range has the above two crystal structures in a well balanced manner. Accordingly, with a cathode active material containing such a lithium-containing composite oxide, the discharge capacity of the obtainable lithium ion secondary battery can readily be made high. Further, with a view to making the discharge capacity of the lithium ion secondary battery high, $H_{110}/H_{003}$ is more preferably from 0.07 to 0.13, still more preferably from 0.075 to 0.11.

In the X-ray diffraction pattern of the lithium-containing composite oxide, the crystallite diameter ($D_{110}$) obtained by the Scheller equation from a peak of (110) plane assigned to a crystal structure with space group R-3m is preferably from 30 to 90 nm, more preferably from 35 to 80 nm, still more preferably from 40 to 80 nm. When $D_{110}$ is at least 30 nm, the stability of the crystal structure of the lithium-containing composite oxide will improve. When $D_{110}$ is at most 80 nm, the cycle characteristics of the obtainable lithium ion secondary battery tend to be favorable. $D_{110}$ is the crystallite diameter in the a-b axis direction of a crystallite having a crystal structure with space group R-3m. Further, the a-b axis direction is a direction of diffusion of Li during charging and discharging.

In the X-ray diffraction pattern of the lithium-containing composite oxide, the crystallite diameter ($D_{003}$) obtained by the Scheller equation from a peak of (003) plane assigned to a crystal structure with space group R-3m is preferably from 60 to 140 nm, more preferably from 60 to 120 nm, still more preferably from 60 to 115 nm. When $D_{003}$ is at least 60 nm, the cycle characteristics of the obtainable lithium ion secondary battery tend to be favorable. When $D_{003}$ is at most 140 nm, the discharge capacity of the lithium ion secondary battery tends to be high. $D_{003}$ is the crystallite diameter in the c-axis direction of the crystallite having a crystal structure with space group R-3m. The c-axis direction is the lamination direction of the crystallite.

The lithium-containing composite oxide is present in the form of secondary particles having a plurality of primary particles agglomerated. The shape of the primary particles and the secondary particles may, for example be a shape of spheres, needles or plates, and is not particularly limited. The shape of the primary particles and the secondary particles of the lithium-containing composite oxide is preferably a shape of spheres, with a view to making the electrode density high when the present active material is formed into an electrode.

The average particle size ($D_{50}$) of the lithium-containing composite oxide is preferably from 3 to 30 μm, more preferably from 4 to 25 μm, still more preferably from 5 to 20 μm. When the average particle size ($D_{50}$) is from 3 to 30 μm, the electrode density can be made high when the present active material is formed into an electrode.

The average particle size ($D_{50}$) is a particle size at a point of 50% on an accumulative volume distribution curve which is drawn by obtaining the particle size distribution on the volume basis and taking the whole to be 100%, that is, a volume-based accumulative 50% size. The particle size distribution is obtained from the frequency distribution and accumulative volume distribution curve measured by means of a laser scattering particle size distribution measuring apparatus (for example, a laser diffraction/scattering type particle size distribution measuring apparatus). The measurement is carried out by sufficiently dispersing the powder in an aqueous medium by e.g. ultrasonic treatment.

The specific surface area of the lithium-containing composite oxide is preferably from 0.1 to 10 $m^2/g$, more preferably from 0.15 to 5 $m^2/g$. When the specific surface area of the cathode active material is within the above range, the discharge capacity can be made high, and the electrode density can be made high.

The specific surface area is a value measured by a BET (Brunauer, Emmet, Teller) method. In the measurement of the specific surface area, nitrogen gas is used as an absorption gas.

The lithium-containing composite oxide preferably has a covering layer on its surface. When the surface of the lithium-containing composite oxide has a covering layer, the metal component of the lithium-containing composite oxide will hardly elute into the electrolytic solution. As a result, the cycle characteristics of the lithium ion secondary battery can be improved. Here, "covering" means a state where aggregates of particles are chemically or physically adsorbed to a part of or the entire surface of the lithium-containing composite oxide.

As the particles of the covering layer, a compound containing a metal may be mentioned. The compound is preferably a compound containing a metal in Group 3 to 13 of the periodic table, or a lithium compound.

The metal in the compound containing a metal in Group 3 to 13 of the periodic table is preferably at least one metal selected from the group consisting of Al, Y, Ga, In, La, Pr, Nd, Gd, Dy, Er and Yb. The compound may, for example, be an oxide, a halide, a phosphate or a sulfate. With a view to forming an electrochemically stable covering material, preferred is $Al_2O_3$, $Y_2O_3$, $Gd_2O_3$, $Er_2O$, $AlF_3$, $Al_2(PO_4)_3$ or $Al_2(SO_4)_3$.

The lithium compound may be a compound containing Li and at least one member selected from the group consisting of S, B and F. Specifically, it may be $Li_2SO_4$, $Li_3BO_3$, $Li_2B_4O_7$, LiF or a hydrate thereof.

The mass of the covering layer is preferably at least 0.01 mass % and at most 10 mass %, more preferably at least 0.05 mass % and at most 5%, particularly preferably at least 0.1 mass % and at most 3% to the mass of the lithium-containing composite oxide.

The presence of the covering layer may be confirmed by an electron microscope such as a SEM (scanning electron microscope) or a TEM (transmission electron microscope). Further, the atoms constituting the covering layer may be confirmed by an EDX (energy dispersive X-ray spectroscopy) attached to the electron microscope. The coating amount may be determined by e.g. inductively coupled plasma spectrometry.

As the present active material, a plurality of lithium-containing composite oxides differing in the composition which are solid solution type lithium-containing composite active materials may be mixed, or a solid solution type lithium-containing composite oxide and other lithium-containing composite oxide may be mixed. As the present active material, it is preferred to use the solid solution type lithium-containing composite oxide by itself.

Other lithium-containing composite oxide may, for example, be a composite oxide having a layered rock salt crystal structure with space group R-3m or a spinel structure composite oxide. The composite oxide having a layered rock salt crystal structure with space group R-3m may, for example, be $LiCoO_2$ or $LiMO_2$ (wherein M is an element containing at least Ni and Mn).

The average particle size ($D_{50}$) of the present active material is preferably from 3 to 30 μm, more preferably from 4 to 25 μm, still more preferably from 5 to 20 μm. When the average particle size ($D_{50}$) is from 3 to 30 μm, the electrode density when the present active material is formed into an electrode can be made high. The average particle size ($D_{50}$) of the present active material may be measured by the same measurement method as for the lithium-containing composite oxide.

The specific surface area of the present active material is preferably from 0.1 to 10 $m^2/g$, more preferably from 0.15 to 5 $m^2/g$. When the specific surface area of the cathode active material is within the above range, the discharge capacity can be made high, and the electrode density can be made high. The specific surface area of the present active material is measured in the same manner as in the case of the lithium-containing composite oxide.

(Process for Producing Cathode Active Material)

The lithium-containing composite oxide contained in the present active material may be produced, for example, by a process comprising the following steps (a) and (b).

(a) A step of mixing a precursor containing at least Ni and Mn with a lithium compound, and firing the obtained mixture to obtain a lithium-containing composite oxide.

(b) As the case requires, a step of forming a covering layer on the surface of the lithium-containing composite oxide.

Step (a):

The precursor may be prepared, for example, by a method of obtaining a compound containing at least Ni and Mn by a coprecipitation method. The coprecipitation method may, for example, be an alkali coprecipitation method or a carbonate coprecipitation method.

The alkali coprecipitation method is a method wherein an aqueous metal salt solution containing at least Ni and Mn, and a pH adjusting solution containing a strong alkali, are continuously supplied to a reaction tank and mixed, and while maintaining the pH in the mixture to be constant, a hydroxide containing at least Ni and Mn, is precipitated.

The carbonate coprecipitation method is a method wherein an aqueous metal salt solution containing at least Ni and Mn, and an aqueous carbonate solution containing an alkali metal, are continuously supplied to a reaction tank and mixed, and in the mixture, a carbonate containing at least Ni and Mn, is precipitated.

The precursor is preferably produced by the alkali coprecipitation method in that the cycle characteristics of the lithium ion secondary battery can thereby easily be made good.

Now, a process for producing a hydroxide precursor (hereinafter referred to simply as a hydroxide) will be described in detail with reference to the alkali coprecipitation method.

The metal salts may, for example, be nitrates, acetates, chlorides or sulfates of the respective transition metal elements, and sulfates are preferred in that the material costs are relatively inexpensive and excellent battery characteristics are thereby obtainable. As the metal salts, a sulfate of Ni, a sulfate of Mn and a sulfate of Co are more preferred.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

The ratio of Ni, Co and Mn in the aqueous metal salt solution is adjusted to be the same as the ratio of Ni, Co and Mn to be contained in the finally obtainable lithium-containing composite oxide (1).

The total concentration of Mn and at least one member selected from Ni and Co in the aqueous metal salt solution is preferably from 0.1 to 3 mol/kg, more preferably from 0.5 to 2.5 mol/kg. When the total concentration of Mn and at least one member selected from Ni and Co, is at least the above lower limit value, the productivity will be excellent.

When the total concentration of Mn and at least one member selected from Ni and Co, is at most the above upper limit value, the metal salts can be sufficiently dissolved in water.

The aqueous metal salt solution may contain an aqueous medium other than water.

The aqueous medium other than water, may, for example, be methanol, ethanol, 1-propanol, 2-propanol, ethylene glycol, propylene glycol, diethylene glycol, dipropylene glycol, polyethylene glycol, butanediol or glycerin. The proportion of the aqueous medium other than water is preferably from 0 to 20 parts by mass, more preferably from 0 to 10 parts by mass, particularly preferably from 0 to 1 part by mass, per 100 parts by mass of water from the viewpoint of safety, environmental aspect, handling efficiency and costs.

The pH adjusting solution is preferably an aqueous solution containing a strong alkali.

The strong alkali is preferably at least one member selected from the group consisting of sodium hydroxide, potassium hydroxide and lithium hydroxide.

To the mixed liquid, a complexing agent (aqueous ammonia or an aqueous ammonium sulfate solution) may be added to adjust the solubility of Mn ions and at least one member selected from Ni ions and Co ions.

The aqueous metal salt solution and the pH adjusting solution are preferably mixed with stirring in the reaction tank.

The stirring device may, for example, be a three-one motor, and the stirring blades may, for example, be anchor-type, propeller-type or paddle-type.

The reaction temperature is preferably from 20 to 80° C., more preferably from 25 to 60° C., with a view to accelerating the reaction.

Mixing of the aqueous metal salt solution and the pH adjusting solution is preferably conducted in a nitrogen atmosphere or in an argon atmosphere, with a view to preventing oxidation of the hydroxide, and it is particularly preferably conducted in a nitrogen atmosphere from the viewpoint of costs.

During the mixing of the aqueous metal salt solution and the pH adjusting solution, it is preferred to maintain the pH in the reaction tank to be a pH set within a range of from 10 to 12, with a view to letting the coprecipitation reaction proceed properly. When the mixing is conducted at a pH of at least 10, coprecipitates are deemed to be a hydroxide.

As the method for precipitating a hydroxide, two types may be mentioned, i.e. a method (hereinafter referred to as a concentration method) of carrying out the precipitation reaction while concentrating a hydroxide by withdrawing the mixed liquid in the reaction tank through a filter (e.g. a filter cloth), and a method (hereinafter referred to as an overflow method) of carrying out the precipitation reaction while maintaining the concentration of a hydroxide to be low by withdrawing the mixed liquid in the reaction tank, together with the hydroxide, without using a filter. The concentration method is preferred, with a view to making the particle size distribution narrow.

The precursor is preferably washed to remove impurity ions. The washing method may, for example, be a method of repeating pressure filtration and dispersion into distilled water. Such washing is preferably repeated until the electrical conductivity of the filtrate or the supernatant at the time when the precursor is dispersed in distilled water, becomes to be at most 50 mS/m, more preferably repeated until the electrical conductivity becomes to be at most 20 mS/m.

After the washing, the precursor may be dried as the case requires.

The drying temperature is preferably from 60 to 200° C., more preferably from 80 to 130° C. When the drying temperature is at least the above lower limit value, the drying time can be shortened. When the drying temperature is at most the above upper limit value, it is possible to prevent the progress of oxidation of the precursor.

The drying time may be properly set depending upon the amount of the precursor and is preferably from 1 to 300 hours, more preferably from 5 to 120 hours.

The specific surface area of the precursor is preferably from 3 to 60 m$^2$/g, more preferably from 5 to 40 m$^2$/g. When the specific surface area of the precursor is within the above range, the specific surface area of the present active material can be easily controlled to be within a preferred range. Here, the specific surface area of the precursor is a value measured after the precursor is dried at 120° C. for 15 hours.

$D_{50}$ of the precursor is preferably from 3 to 15.5 μm, more preferably from 4 to 12.5 μm, still more preferably from 3 to 10.5 μm. When $D_{50}$ of the precursor is within the above range, $D_{50}$ of the present active material can be easily controlled to be within a preferred range.

The precursor and a lithium compound are mixed and fired, whereby a lithium-containing composite oxide will be formed.

The lithium compound is preferably one member selected from the group consisting of lithium carbonate, lithium hydroxide and lithium nitrate. Lithium carbonate is more preferred from the viewpoint of handling efficiency in the production process.

The method for mixing the precursor and the lithium compound may, for example, be a method of using a rocking mixer, a Nauta mixer, a spiral mixer, a cutter mill or a V mixer.

The ratio of the molar amount of Li contained in the lithium compound to the total molar amount ($X_2$) of Ni, Co and Mn contained in the precursor (i.e. Li/$X_2$) is preferably from 1.1 to 1.8, more preferably from 1.1 to 1.7, still more preferably from 1.2 to 1.7. When Li/$X_2$ is within the above range, the Li/X ratio contained in the lithium-containing composite oxide can be made to be within a desired range, and the discharge capacity of the lithium ion secondary battery can be made high.

The firing apparatus may, for example, be an electric furnace, a continuous firing furnace or a rotary kiln.

During the firing, the precursor is oxidized, and therefore, the firing is preferably conducted in the atmospheric air, and it is particularly preferred to carry out the firing while supplying air.

The supply rate of air is preferably from 10 to 200 mL/min., more preferably from 40 to 150 mL/min., per 1 L (liter) of the inner volume of the furnace.

By supplying air during the firing, the metal element contained in the precursor will be sufficiently oxidized. As a result, it is possible to obtain a lithium-containing composite oxide having high crystallinity and having a crystal structure with space group C2/m and a crystal structure with space group R-3m.

The firing temperature is from 965 to 1,100° C. The firing temperature is preferably at least 970° C., more preferably at least 975° C., still more preferably at least 980° C. When the firing temperature is at least 965° C., the domains of Li(Li$_{1/3}$Mn$_{2/3}$)O$_2$ tend to grow. Further, the firing temperature is preferably at most 1,100° C., more preferably at most 1,080° C., still more preferably at most 1,050° C. When the firing temperature is at most 1,100° C., volatilization of Li can be suppressed during the firing, and a lithium-containing composite oxide in accordance with the charge ratio with regard to Li can be obtained.

The firing time is preferably from 4 to 40 hours, more preferably from 4 to 20 hours.

The firing may be one-stage firing or two-stage firing i.e. temporary firing followed by main firing. The two-stage firing is preferred since Li thereby tends to be readily uniformly dispersed in the lithium-containing composite oxide. In the case of conducting two-stage firing, main firing is carried out at a temperature within a range of the above firing temperature. And, the temperature for the temporary firing is preferably from 400 to 700° C., more preferably from 500 to 650° C.

Step (b):

The method for forming the covering layer on the surface of the lithium-containing composite oxide may, for example, be a powder mixing method, a gas phase method, a spray coating method or a dipping method. The following description will be made with reference to a case where the covering layer is an Al compound.

The powder mixing method is a method of mixing the lithium-containing composite oxide and the Al compound, followed by heating. The gas phase method is a method of gasifying an organic compound containing Al, such as aluminum ethoxide, aluminum isopropoxide or aluminum acetylacetonate, and letting the organic compound be in contact with the surface of the lithium-containing composite oxide and reacted. The spray coating method is a method of spraying a solution containing Al to the lithium-containing composite oxide, followed by heating.

Otherwise, a covering layer containing an Al compound may be formed on the surface of the lithium-containing composite oxide by contacting to the lithium-containing composite oxide, e.g. by a spray coating method, an aqueous solution having dissolved in a solvent, a water-soluble Al compound (such as aluminum acetate, aluminum oxalate, aluminum citrate, aluminum lactate, basic aluminum lactate or aluminum nitrate) to form an Al compound, followed by heating to remove the solvent.

(Positive Electrode for Lithium Ion Secondary Battery)

The positive electrode for a lithium ion secondary battery of the present invention (hereinafter referred to as the present positive electrode) contains the present active material. Specifically, it has a cathode active material layer comprising the present active material, an electrically conductive material and a binder, formed on a positive electrode current collector.

As the electrically conductive material, carbon black (such as acetylene black or Ketjen black), graphite, vapor-grown carbon fibers or carbon nanotubes may, for example, be mentioned.

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

As the positive electrode current collector, an aluminum foil or a stainless steel foil may, for example, be mentioned.

The present positive electrode may be produced, for example, by the following method.

The present active material, the electrically conductive material and the binder are dissolved or dispersed in a medium to obtain a slurry. The obtained slurry is applied to the positive electrode current collector, and the medium is removed e.g. by drying to form a layer of the cathode active material. As the case requires, the layer of the cathode active material may be pressed e.g. by roll pressing. The present positive electrode is obtained in such a manner.

Otherwise, the present active material, the electrically conductive material and the binder are kneaded with a medium to obtain a kneaded product. The obtained kneaded product is pressed on the positive electrode current collector to obtain the present positive electrode.

(Lithium Ion Secondary Battery)

The lithium ion secondary battery of the present invention (hereinafter referred to as the present battery) has the present positive electrode. Specifically, it comprises the present positive electrode, a negative electrode, a separator and a non-aqueous electrolyte.

The negative electrode contains an anode active material. Specifically, it has an anode active material layer containing an anode active material and as the case requires an electrically conductive material and a binder, formed on a negative electrode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used as the anode active material may be Si or Sn, and is preferably Si. As another anode active material, an oxide such as iron oxide, ruthenium oxide, molybdenum oxide, tungsten oxide, titanium oxide or tin oxide, or a nitride may, for example, be mentioned.

As the electrically conductive material and the binder for the negative electrode, the same ones as for the positive electrode may be used. As the negative electrode current collector, a metal foil such as a nickel foil or a copper foil may be mentioned.

The negative electrode may be produced, for example, by the following method.

The anode active material, the electrically conductive material and the binder are dissolved or dispersed in a medium to obtain a slurry. The obtained slurry is applied to the negative electrode current collector, and the medium is removed e.g. by drying, followed by pressing to obtain the negative electrode.

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed or dissolved.

The organic solvent may be an organic solvent known for a non-aqueous electrolytic solution. Specifically, it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dimethyl carbonate or diethyl carbonate). As the organic solvent, one type may be used alone, or two or more types may be used in combination.

As the inorganic solid electrolyte, a material having lithium ion conductivity may be used. The inorganic solid electrolyte may, for example, be lithium nitride or lithium iodide.

As the polymer to be used for the solid polymer electrolyte, an ether polymer compound (such as polyethylene oxide or its crosslinked product), a polymethacrylate ester polymer compound or an acrylate polymer compound may, for example, be mentioned. As the polymer compound, one type may be used alone, or two or more types may be used in combination.

As the polymer to be used for the gelled polymer electrolyte, a fluorinated polymer compound (such as polyvinylidene fluoride or a vinylidene fluoride/hexafluoropropylene copolymer), polyacrylonitrile, an acrylonitrile copolymer or an ether polymer compound (such as polyethylene oxide or its crosslinked product) may, for example, be mentioned. As a monomer to be copolymerized to obtain the copolymer, polypropylene oxide, methyl methacrylate, butyl methacrylate, methyl acrylate or butyl acrylate may, for example, be mentioned.

The polymer compound is preferably a fluorinated polymer compound in view of the stability against the redox reaction.

As the electrolyte salt, any one of those commonly used for a lithium ion secondary battery may be used. The electrolyte salt may, for example, be $LiClO_4$, $LiPF_6$, $LiBF_4$ or $CH_3SO_3Li$.

Between the positive electrode and the negative electrode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

As a material of a battery exterior package, nickel-plated iron, stainless steel, aluminum or its alloy, nickel, titanium, a resin material or a film material may, for example, be mentioned.

The shape of the lithium ion secondary battery may, for example, be a coin-shape, a sheet-form (film-form), a folded shape, a wound cylinder with bottom, or a button shape, and is suitably selected depending upon the intended use.

EXAMPLES

Now, the present invention will be described in detail with reference to Examples, but it should be understood that the present invention is by no means thereby restricted. Ex. 1 to 5 are Examples of the present invention, and Ex. 6 to 8 are Comparative Examples.

(Composition Analysis)

Composition analysis of the lithium-containing composite oxide was carried out by a plasma emission spectroscope (SPS3100H manufactured by SII NanoTechnology Inc.). From the ratio of the molar amounts of Li, Ni, Co and Mn obtained from the composition analysis, "a", $\alpha$, $\beta$ and $\gamma$ in the formula: $aLi(Li_{1/3}Mn_{2/3})O_2 \cdot (1-a)LiNi_\alpha Co_\beta Mn_\gamma O_2$ were calculated.

(X-Ray Diffraction Measurement)

The X-ray diffraction of the lithium-containing composite oxide was measured by means of an X-ray diffraction apparatus (manufactured by Rigaku Corporation, apparatus name: SmartLab). The measurement conditions are shown in Table 1. The measurement was carried out at 25° C. Before the measurement, 1 g of the lithium-containing composite oxide and 30 mg of standard sample 640e for X-ray diffraction were mixed in an agate mortar, and this mixture was used as the sample for the measurement.

With respect to the X-ray diffraction pattern obtained, smoothing, background removal and Kα2 removal were conducted under the data processing conditions as identified in Table 1 to calculate a value obtained by dividing the minimum value at from 20.8 deg to 21.5 deg by the maximum value at from 21 deg to 22 deg.

From the respective peaks in the X-ray diffraction patterns, the crystallite diameters ($D_{003}$ and $D_{110}$), the ratio of the minimum value at 2θ of from 20.8 deg to 21.5 deg to the maximum value at 2θ of from 21 deg to 22 deg (minimum value/maximum value), the peak height ratio $H_{110}/H_{003}$, and the integral breadth of a peak of (110) plane assigned to a crystal structure with space group C2/m were obtained.

TABLE 1

| | | |
|---|---|---|
| Apparatus condition | Measurement apparatus | SmartLab manufactured by Rigaku Corporation |
| | Target | Cu |
| | Detector | D/teX Ultra HE manufactured by Rigaku Corporation |
| | Detector baseline | 44div |
| | Detector window | 8div |
| | Gonio length | 300 mm |
| | Soller/PSC | 5.0 (deg.) |
| | IS long dimension | 10 (mm) |
| | PSA | Open |
| | Soller | 5.0 (deg.) |
| | Monochromatization method | Kβ filter method |
| Sample condition | Sample holder | Diameter: 24 mm, depth: 0.5 mm |
| | Rotation of sample during measurement | Rotated (30 rpm) |
| Measurement condition | Measurement method | General purpose measurement (focal method) |
| | Scanning axis | 2θ/θ |
| | Mode | Continuous |
| | Range specification | Absolute |
| | Initiation (deg.) | 15 (deg.) |
| | Termination (deg.) | 70 (deg.) |
| | Step (deg.) | 0.0052 (deg.) |
| | Speed measurement time | 1 (deg./min.) |
| | IS (deg.) | ⅓ (deg.) |
| | RS1 (mm) | 8 (mm) |
| | RS2 (mm) | 13 (mm) |
| | Attenuator | Open |
| | Tube voltage (kV) | 45 (kV) |
| | Tube current (mA) | 200 (mA) |
| Data processing condition | Analysis software | PDXL2 manufactured by Rigaku Corporation |
| | Smoothing | Smoothing by B-Spline, χ threshold: 1.50, Smoothing parameter 10.00, smoothing point 11 |
| | Background removal | Fitting Peak threshold 1.00, intensity threshold 10.00 |
| | Kα2 removal | Intensity ratio: 0.4970 |
| | Peak search | Secondary differentiation, σ cut: 3.00 |
| | Profile fitting | Fitting of measurement data |
| | Peak shape | Variance pseudo-voigt function |

(Particle Size)

Particles (hydroxide or cathode active material) to be measured were sufficiently dispersed in water by ultrasonic treatment, and measurement was conducted by a laser diffraction/scattering type particle size distribution measuring apparatus (MT-3300EX, manufactured by NIKKISO CO., LTD.) to obtain the frequency distribution and accumulative volume distribution curve thereby to obtain a volume-based particle size distribution. From the obtained accumulative volume distribution curve, $D_{10}$, $D_{50}$ and $D_{90}$ of the hydroxide and the cathode active material were obtained.

(Specific Surface Area)

The specific surface area of the hydroxide or the cathode active material to be measured was calculated by a nitrogen adsorption BET method using a specific surface area measuring apparatus (HM model-1208, manufactured by Mountech Co., Ltd.). Degassing was carried out at 105° C. for 20 minutes when the specific surface area of the hydroxide was measured, and at 200° C. for 20 minutes when the specific surface area of the cathode active material was measured.

(Tap Density)

The tap density $\rho_t$ (unit: g/cm$^3$) of the hydroxide to be measured was calculated in accordance with the following formula. In the following formula, V is the volume (unit: cm$^3$) of the sample after tapping, which is a value obtained by weighing the sample (cathode active material) in a graduated resin container (capacity: 20 cm$^3$), attaching the container to a tapping apparatus (KYT-4000K manufactured by SEISHIN ENTERPRISE Co., Ltd.), followed by tapping 700 times, and reading the volume of the sample in the container by the graduations of the container. In the following formula, m is the mass (unit: g) of the sample, and is the mass of the sample put in the resin container.

$\rho_t = m/V$

Ex. 1

Nickel(II) sulfate hexahydrate, manganese(II) sulfate pentahydrate and ammonium sulfate as a complexing agent were dissolved in distilled water to obtain an aqueous sulfate solution. On that occasion, the ratio of the molar amount of Ni and Mn would be as identified in Table 2, the total concentration of the sulfates would be 1.5 mol/kg, and the concentration of ammonium sulfate would be 0.15 mol/kg. Further, sodium hydroxide was dissolved in distilled water so that the concentration would be 12 mass % to prepare an aqueous sodium hydroxide solution as a pH adjusting solution.

Step (a):

Into a 2 L baffle-equipped glass reactor, distilled water was put and heated to 50° C. by a mantle heater. While stirring the liquid in the reactor by a paddle type stirring blade, the aqueous sulfate solution was added at a rate of 5.0 g/minute for 12 hours, and the pH adjusting solution was added to maintain the pH of the mixed liquid to be 10.5, to obtain a hydroxide containing Ni and Mn. During the addition of the raw material solution, nitrogen gas was made to flow at a rate of 1.0 L/min in the reactor. Further, a liquid containing no hydroxide was continuously withdrawn using filter cloth, so that the liquid amount in the reactor would not exceed 2 L. In order to remove impurity ions from the obtained hydroxide, pressure filtration and dispersion in distilled water were repeated for washing. Washing was completed at a point where the electrical conductivity of the filtrate became 20 mS/m, and the hydroxide was dried at 120° C. for 15 hours.

Of the hydroxide obtained by the above method, the compositional ratio, the particle size, the specific surface area and the tap density are shown in Table 2.

The hydroxide and lithium carbonate were mixed so that the ratio in molar amount of Li to X (wherein X is the total amount of Ni and Mn contained in the hydroxide) (i.e. Li/X) would be 1.58 to obtain a mixture.

In an electric furnace, while supplying air, the mixture was subjected to temporary firing at 600° C. in air over a period of 3 hours to obtain a temporarily fired product. Then, in an electric furnace, while supplying air, the temporarily fired product was subjected to main firing at 990° C. in air over a period of 16 hours to obtain a lithium-containing composite oxide.

The obtained lithium-containing composite oxide was used as a cathode active material. The results of evaluations of the lithium-containing composite oxide are shown in Table 3.

Ex. 2

A lithium-containing composite oxide was obtained in the same manner as in Ex. 1 except that the mixing ratio (Li/X) of lithium carbonate to the hydroxide would be 1.54, and the firing temperature in main firing was 1,035° C.

The obtained lithium-containing composite oxide was used as the cathode active material. The results of evaluations of the lithium-containing composite oxide are shown in Table 3.

Ex. 3

The hydroxide in Table 2 was used as the precursor. The hydroxide and lithium carbonate were mixed so that the ratio in molar amount of Li to X (wherein X is Ni and Mn contained in the hydroxide) (i.e. Li/X) would be 1.60, to obtain a mixture.

A lithium-containing composite oxide was obtained in the same manner as in Ex. 1 except that the above mixture was used, and the firing temperature in main firing was 1,005° C.

The obtained lithium-containing composite oxide was used as the cathode active material. The results of evaluations of the lithium-containing composite oxide are shown in Table 3.

Ex. 4

The same aqueous sulfate solution, aqueous ammonium sulfate solution and pH adjusting solution as those prepared in Ex. 1 were prepared.

Step (a):

Into a 2 L baffle-equipped glass reactor, distilled water was put and heated to 50° C. by a mantle heater. While stirring the liquid in the reactor by a paddle type stirring blade, the aqueous sulfate solution was added at a rate of 5.0 g/minute and the aqueous ammonium sulfate solution was added at a rate of 0.5 g/min for 28 hours, and the pH adjusting solution was added to maintain the pH of the mixed liquid to be 10.5, to obtain a hydroxide containing Ni and Mn. During the addition of the raw material solution, nitrogen gas was made to flow at a rate of 1.0 L/min in the reactor. Further, a liquid containing no hydroxide was continuously withdrawn using filter cloth, so that the liquid amount in the reactor would not exceed 2 L. In order to remove impurity ions from the obtained hydroxide, pressure filtration and dispersion in distilled water were repeated for washing. Washing was completed at a point where the electrical conductivity of the filtrate became 20 mS/m, and the hydroxide was dried at 120° C. for 15 hours.

Of the hydroxide obtained by the above method, the composition, the particle size, the specific surface area and the tap density are shown in Table 2.

The hydroxide obtained by the above method and lithium carbonate were mixed so that the ratio in molar amount of Li to X (wherein X is Ni and Mn contained in the hydroxide) (i.e. Li/X) would be 1.49 to obtain a mixture.

In an electric furnace, while supplying air, the mixture was subjected to temporary firing at 600° C. in air over a period of 3 hours to obtain a temporarily fired product. Then, in an electric furnace, while supplying air, the temporarily fired product was subjected to main firing at 990° C. in air over a period of 16 hours to obtain a lithium-containing composite oxide.

The obtained lithium-containing composite oxide was used as a cathode active material. The results of evaluations of the lithium-containing composite oxide are shown in Table 3.

Ex. 5

In distilled water, nickel(II) sulfate hexahydrate and manganese(II) sulfate pentahydrate were dissolved so that the molar ratio of Ni and Mn would be as identified in Table 2 and that the total amount of the sulfates would be 1.5 mol/kg, and ammonium sulfate as a complexing agent was dissolved so that the concentration would be 0.15 mol/kg, to obtain an aqueous sulfate solution. As a pH adjusting solution, the same solution as prepared in Ex. 1 was prepared.

Step (a):

Into a 2 L baffle-equipped glass reactor, distilled water was put and heated to 50° C. by a mantle heater. While stirring the liquid in the reactor by a paddle type stirring blade, the aqueous sulfate solution was added at a rate of 5.0 g/minute for 14 hours, and the pH adjusting solution was added to maintain the pH of the mixed liquid to be 11, to obtain a hydroxide containing Ni and Mn. During the addition of the raw material solution, nitrogen gas was made to flow at a rate of 1.0 L/min in the reactor. Further, a liquid containing no hydroxide was continuously withdrawn using filter cloth, so that the liquid amount in the reactor would not exceed 2 L. In order to remove impurity ions from the obtained hydroxide, pressure filtration and dispersion in distilled water were repeated for washing. Washing was completed at a point where the electrical conductivity of the filtrate became 20 mS/m, and the hydroxide was dried at 120° C. for 15 hours. Of the hydroxide obtained by the above method, the composition, the particle size, the specific surface area and the tap density are shown in Table 2.

The hydroxide obtained by the above method and lithium carbonate were mixed so that the ratio in molar amount of Li to X (wherein X is Ni, Co and Mn contained in the hydroxide) (i.e. Li/X) would be 1.41 to obtain a mixture.

In an electric furnace, while supplying air, the mixture was subjected to temporary firing at 600° C. in air over a period of 3 hours to obtain a temporarily fired product. Then, in an electric furnace, while supplying air, the temporarily fired product was subjected to main firing at 990° C. in air over a period of 16 hours to obtain a lithium-containing composite oxide.

The obtained lithium-containing composite oxide was used as a cathode active material. The results of evaluations of the lithium-containing composite oxide are shown in Table 3.

Ex. 6

A hydroxide was obtained in the same manner as in Ex. 1 except that under the conditions to obtain the hydroxide in the step (a), the addition time of the aqueous sulfate solution and the aqueous ammonium sulfate solution was changed to 13 hours.

Of the hydroxide obtained by the above method, the composition, the particle size, the specific surface area and the tap density are shown in Table 2.

The hydroxide obtained by the above method and lithium carbonate were mixed so that the ratio in molar amount of Li to X (wherein X is Ni and Mn contained in the hydroxide) (i.e. Li/X) would be 1.54 to obtain a mixture.

A lithium-containing composite oxide was obtained in the same manner as in Ex. 1 except that the firing temperature in main firing was 920° C. The obtained lithium-containing composite oxide was used as the cathode active material. The results of evaluation of the lithium-containing composite oxide are shown in Table 3.

Ex. 7

The hydroxide as identified in Table 2 was used as the precursor. The hydroxide and lithium carbonate were mixed so that the ratio in molar amount of Li to X (wherein X is Ni and Mn contained in the hydroxide) (i.e. Li/X) would be 1.58 to obtain a mixture.

Using the mixture, a lithium-containing composite oxide was obtained in the same manner as in Ex. 1 except that the firing temperature in main firing was 960° C. The obtained lithium-containing composite oxide was used as the cathode active material. The results of evaluation of the lithium-containing composite oxide are shown in Table 3.

Ex. 8

A hydroxide was obtained in the same manner as in Ex. 1 except that under the conditions to obtain the hydroxide in the step (a), the addition time of the aqueous sulfate solution and the aqueous ammonium sulfate solution was changed to 14 hours, and the pH adjusting solution was added to maintain the pH of the mixed liquid to be 11.

Of the hydroxide obtained by the above method, the composition, the particle size, the specific surface area and the tap density are shown in Table 2.

The hydroxide obtained by the above method and lithium carbonate were mixed so that the ratio in molar amount of Li to X (wherein X is Ni and Mn contained in the hydroxide) (i.e. Li/X) would be 1.42 to obtain a mixture.

A lithium-containing composite oxide was obtained in the same manner as in Ex. 1 except that the firing temperature in main firing was 935° C. The obtained lithium-containing composite oxide was used as the cathode active material. The results of evaluations of the lithium-containing composite oxide are shown in Table 3.

TABLE 2

| | Hydroxide composition (molar ratio) | | | Particle size | | | Specific surface area | Tap density | Charge | Temporary firing | | | Main firing | | |
|---|---|---|---|---|---|---|---|---|---|---|---|---|---|---|---|
| | Ni | Co | Mn | $D_{10}$ (μm) | $D_{50}$ (μm) | $D_{90}$ (μm) | ($m^2/g$) | ($g/cm^3$) | Li/Me | Temperature (° C.) | Time (hour) | Atmosphere | Temperature (° C.) | Time (hour) | Atmosphere |
| Ex. 1 | 25.0 | 0.0 | 75.0 | 4.9 | 6.5 | 9.3 | 42.0 | 0.8 | 1.58 | 600 | 3 | Air | 990 | 16 | Air |
| Ex. 2 | 25.0 | 0.0 | 75.0 | 4.9 | 6.5 | 9.3 | 42.0 | 0.8 | 1.54 | 600 | 3 | Air | 1035 | 16 | Air |
| Ex. 3 | 25.0 | 0.0 | 75.0 | 3.8 | 5.2 | 7.1 | 44.7 | 1.1 | 1.60 | 600 | 3 | Air | 1005 | 16 | Air |
| Ex. 4 | 30.0 | 0.0 | 70.0 | 4.1 | 5.5 | 7.8 | 25.9 | 1.2 | 1.49 | 600 | 3 | Air | 990 | 16 | Air |
| Ex. 5 | 32.3 | 4.6 | 63.1 | 3.1 | 4.7 | 7.1 | 37.7 | 0.9 | 1.41 | 600 | 3 | Air | 990 | 16 | Air |
| Ex. 6 | 25.0 | 0.0 | 75.0 | 5.3 | 7.0 | 9.8 | 39.5 | 0.8 | 1.54 | 600 | 3 | Air | 920 | 16 | Air |
| Ex. 7 | 25.0 | 0.0 | 75.0 | 3.8 | 5.2 | 7.1 | 44.7 | 1.1 | 1.58 | 600 | 3 | Air | 960 | 16 | Air |
| Ex. 8 | 34.6 | 0.0 | 65.4 | 2.7 | 3.9 | 5.7 | 28.0 | 1.1 | 1.42 | 600 | 3 | Air | 935 | 16 | Air |

TABLE 3

| | Lithium-containing composite oxide | | | | Particle size | | | Specific surface area | Crystallite diameter | | X-ray diffraction pattern | | |
|---|---|---|---|---|---|---|---|---|---|---|---|---|---|
| | a | α | β | γ | $D_{10}$ (μm) | $D_{50}$ (μm) | $D_{90}$ (μm) | ($m^2/g$) | $D_{003}$ (nm) | $D_{110}$ (nm) | Minimum value/ maximum value | $H_{110}/H_{003}$ | Integral breadth of peak of (110) plane |
| Ex. 1 | 0.64 | 0.54 | 0.00 | 0.46 | 4.6 | 6.2 | 8.9 | 1.76 | 102.4 | 54.1 | 0.058 | 0.091 | 0.874 |
| Ex. 2 | 0.62 | 0.53 | 0.00 | 0.47 | 4.8 | 7.2 | 12.1 | 1.34 | 114.8 | 67.8 | 0.014 | 0.091 | 0.668 |
| Ex. 3 | 0.66 | 0.57 | 0.00 | 0.43 | 4.0 | 6.2 | 17.1 | 1.35 | 87.1 | 50.5 | 0.358 | 0.076 | 0.957 |
| Ex. 4 | 0.59 | 0.58 | 0.00 | 0.42 | 4.2 | 5.9 | 9.1 | 1.15 | 89.9 | 43.1 | 0.465 | 0.108 | 1.073 |
| Ex. 5 | 0.50 | 0.54 | 0.08 | 0.38 | 3.6 | 5.7 | 10.4 | 1.61 | 95.9 | 46.4 | 0.274 | 0.083 | 1.160 |
| Ex. 6 | 0.64 | 0.54 | 0.00 | 0.46 | 5.0 | 6.7 | 9.5 | 3.07 | 66.8 | 36.3 | 0.575 | 0.080 | 1.363 |
| Ex. 7 | 0.67 | 0.59 | 0.00 | 0.41 | 3.9 | 5.9 | 16.9 | 1.81 | 68.4 | 35.0 | 0.693 | 0.085 | 1.282 |
| Ex. 8 | 0.53 | 0.61 | 0.00 | 0.39 | 3.1 | 4.5 | 7.2 | 1.81 | 75.9 | 34.1 | 0.763 | 0.065 | 1.416 |

(Battery Evaluation)
(Production of Positive Electrode Sheet)

The cathode active material obtained in each of Ex. 1 to 8, electrically conductive carbon black (SuperC65, tradename, manufactured by TIMCAL Ltd.) as an electrically conductive material, and polyvinylidene fluoride as a binder were weighed in a mass ratio of 88:6:6, and they were added to N-methylpyrrolidone to prepare a slurry.

The slurry was applied on one side of an aluminum foil as a positive electrode current collector having a thickness of 20 μm by means of a doctor blade. The gap of the doctor blade was adjusted so that the thickness of the sheet after roll pressing would be 20 μm. After drying at 120° C., roll pressing was carried out twice to prepare a positive electrode sheet.

(Production of Lithium Secondary Battery)

One having the positive electrode sheet punched out in a rectangle of 24 mm×40 mm, was used as a positive electrode.

Artificial graphite was used as the negative electrode material, and one having a negative electrode sheet punched out in a rectangle of 44 mm×28 mm, was used as a negative electrode.

As a separator, a porous polypropylene having a thickness of 25 μm was used.

As an electrolytic solution, a liquid having $LiPF_6$ dissolved at a concentration of 1 mol/L in a solvent mixture of ethylene carbonate and diethyl carbonate in a volume ratio of 3:7, was used.

Using the positive electrode, negative electrode, separator and electrolytic solution, lamination type lithium secondary batteries 1 to 8 were assembled in a globe box in a dry atmosphere.

(Activation Treatment)

With respect to each of the lithium secondary batteries 1 to 8 using the cathode active materials in Ex. 1 to 8, constant current charging to 4.75 V with a load current of 26 mA per 1 g of the cathode active material, and then discharging at low current to 2.0 V with a load current of 26 mA per 1 g of the cathode active material, were carried out to conduct activation treatment.

(Initial Discharge Capacity and Cycle Test)

With respect to the lithium secondary battery subjected to activation treatment, constant current and constant voltage charging was carried out to 4.45 V with a load current of 200 mA per 1 g of the cathode active material, followed by constant current discharging to 2.0 V with a load current of 200 mA per 1 g of the cathode active material. On that occasion, the discharge capacity at the first time was taken as the initial discharge capacity. This charge and discharge cycle was repeated 100 times in total. The 100c/2c capacity retention (%) was obtained in accordance with the following formula from the discharge capacity at the second cycle and the discharge capacity at the 100th cycle.

100c/2c capacity retention (%)=(discharge capacity at the 100th cycle/discharge capacity at the 2nd cycle)×100

The above obtained initial discharge capacity and 100c/2c/capacity retention of each of the lithium ion secondary batteries 1 to 8 are shown in Table 4.

TABLE 4

|       | Initial discharge capacity (mAh/g) | 100c/2c capacity retention (%) |
|-------|------------------------------------|--------------------------------|
| Ex. 1 | 191.3                              | 89.7                           |
| Ex. 2 | 182.5                              | 90.3                           |
| Ex. 3 | 188.3                              | 86.1                           |
| Ex. 4 | 188.1                              | 94.5                           |
| Ex. 5 | 194.6                              | 86.1                           |
| Ex. 6 | 194.5                              | 69.5                           |
| Ex. 7 | 193.7                              | 74.4                           |
| Ex. 8 | 195.9                              | 74.3                           |

As evident from Tables 3 and 4, a lithium secondary battery using a cathode active material containing a lithium-containing composite oxide wherein the integral breadth of a peak of (110) plane assigned to a crystal structure with space group C2/m is at most 1.25 deg, has higher cycle characteristics than a lithium secondary battery using a cathode active material containing a lithium-containing composite oxide wherein the integral breadth is more than 1.25 deg.

Figure 1:
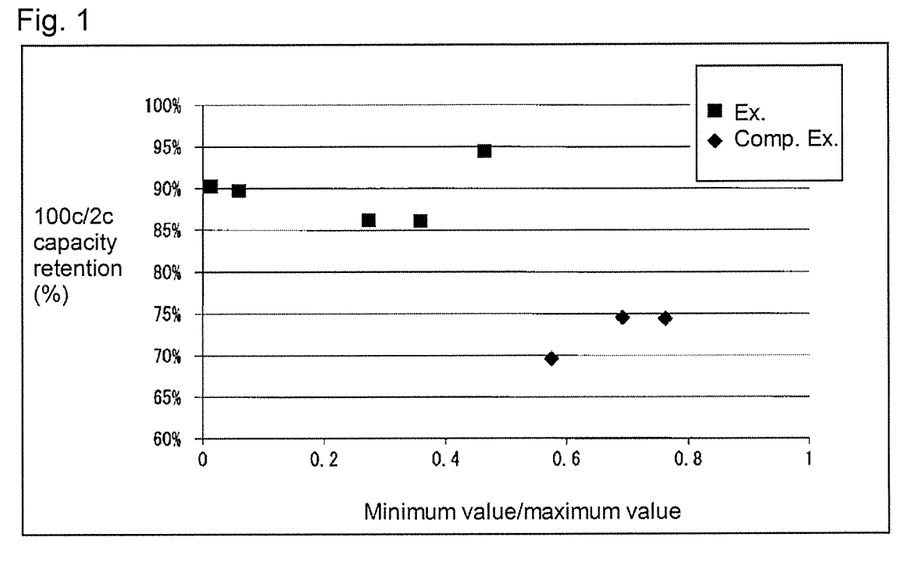
FIG. 1 is a graph obtained by plotting the 100c/2c capacity retention of each of the cathode active materials in Ex. 1 to 8, to the ratio of the minimum value at 2θ of from 20.8 deg to 21.5 deg to the maximum value at 2θ of from 21 deg to 22 deg (i.e. minimum value/maximum value) in an X-ray diffraction pattern of the cathode active material.

Further, as shown in FIG. 1, a lithium secondary battery using each of the cathode active materials in Ex. 1 to 5 wherein in an X-ray diffraction pattern, the value obtained by dividing the minimum value at from 20.8 deg to 21.5 deg by the maximum value at from 21 deg to 22 deg is at most 0.56, is more excellent in the cycle characteristics than a lithium secondary battery using each of the cathode active materials in Ex. 6 to 8 wherein the value is higher than 0.56.

Figure 2:
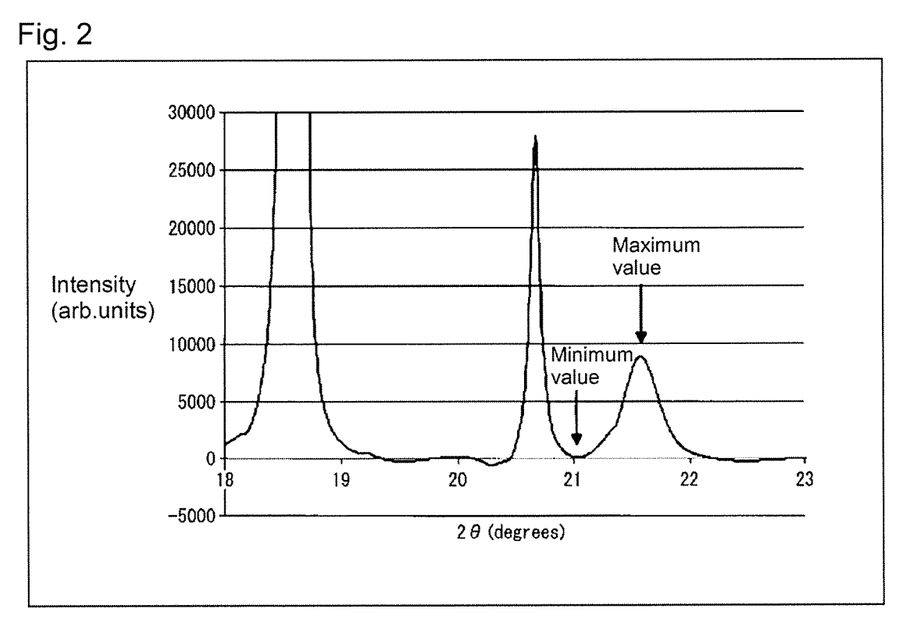
FIG. 2 is a graph showing X-ray diffraction patterns of the cathode active material in Ex. 1 in a region of 2θ of from 18 to 23 deg.

FIG. 2 is an X-ray diffraction pattern of the cathode active material in Ex. 1 after smoothing and background removal treatment. The minimum value at 2θ of from 20.8 deg to 21.5 deg and the maximum value at from 21 deg to 22 deg are shown in FIG. 2.

It is considered that when the C2/m phase crystallinity is favorable in a cathode active material having a solid solution type lithium-containing composite oxide, a crystal structure change accompanying insertion and desorption of Li of the lithium-containing composite oxide is suppressed, whereby the cycle characteristics become high.

Figure 3:
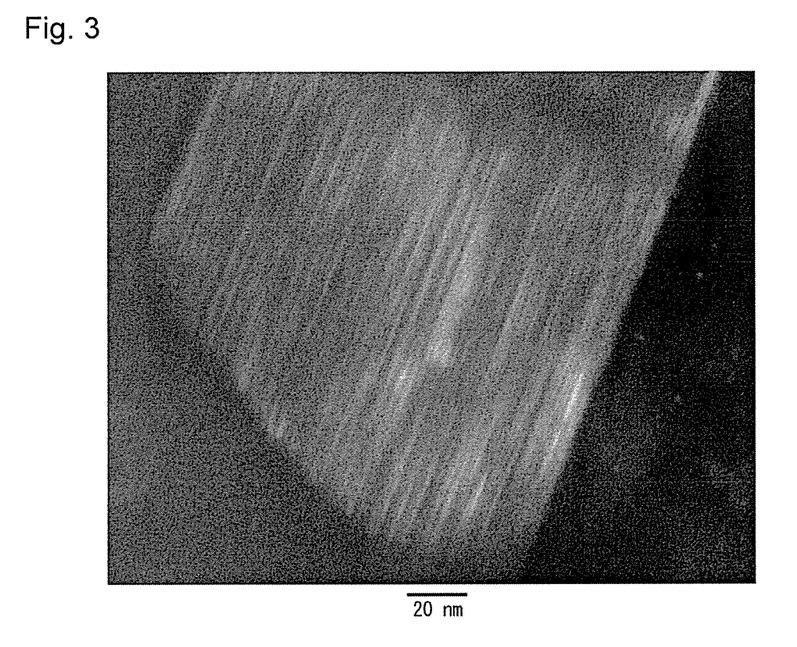
FIG. 3 is a transmission electron microscopic image of the cathode active material in Ex. 1.
Figure 4:
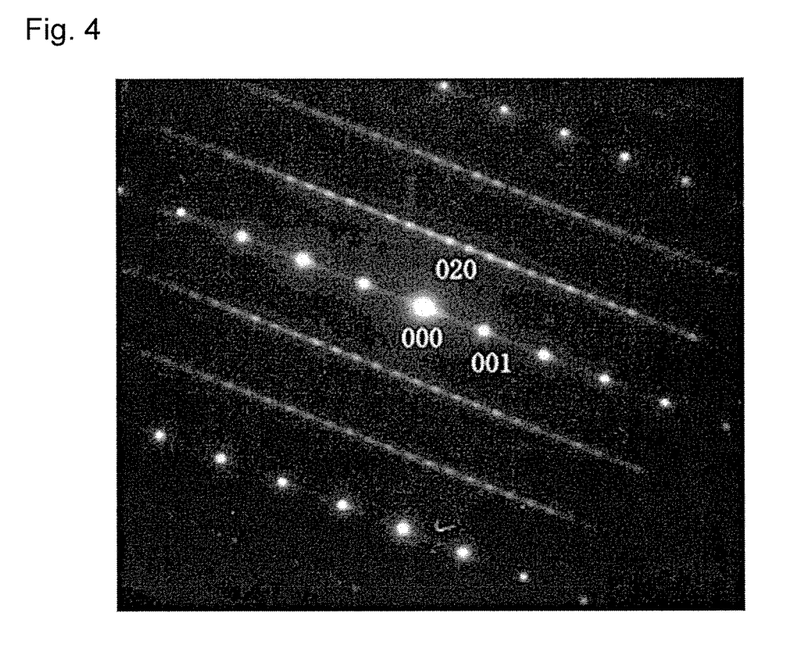
FIG. 4 is an electron diffraction image of the cathode active material in Ex. 1.

Here, as a representative of Ex. 1 to 5, a TEM image and an electron diffraction image of the cathode active material in Ex. 1 are shown in FIGS. 3 and 4, respectively. The TEM image illustrates domains of the C2/m phase of the cathode active material in Ex. 1. It is found from this image that the C2/m phase domains are constituted as arranged in a layered structure with constant distances. Further, according to the electron diffraction image, of the lithium-containing composite oxide, diffraction spots (bright spots) of (020) plane assigned only to the C2/m phase are clearly distinct from one another. It is suggested by these facts that C2/m of the cathode active material in Ex. 1 has high crystallinity.

Accordingly, it is found that in an X-ray diffraction pattern, an integral breadth of a peak of (110) plane assigned to the crystal structure with space group C2/m being at most 1.25 deg means favorable crystallinity of the C2/m phase contained in the solid solution type lithium-containing composite oxide. And, it is considered that a lithium secondary battery using a cathode active material having a lithium-containing composite oxide wherein the above value is at most 1.25 deg has higher cycle characteristics.

Further, it is considered that of the solid solution type lithium-containing composite oxide, in an X-ray diffraction pattern, the value obtained by dividing the minimum value at from 20.8 deg to 21.5 deg by the maximum value at from 21 deg to 22 deg being at most 0.56 means more favorable crystallinity of the C2/m phase contained in the solid solution type lithium-containing composite oxide. And, it is considered that a lithium secondary battery using a cathode active material having a lithium-containing composite oxide wherein the above value is at most 0.56 has high cycle characteristics.

The entire disclosure of Japanese Patent Application No. 2015-221439 filed on Nov. 11, 2015 including specification, claims, drawings and summary is incorporated herein by reference in its entirety.

The invention claimed is:

1. A cathode active material comprising a lithium-containing composite oxide represented by the formula $aLi(Li_{1/3}Mn_{2/3})O_2 \cdot (1-a)LiMO_2$, wherein M is an element containing at least Ni and Mn, and $0<a<1$,
   wherein in an X-ray diffraction pattern, the integral breadth of a peak of (110) plane assigned to a crystal structure with space group C2/m is at most 1.25 deg, and
   wherein in an X-ray diffraction pattern of the lithium-containing composite oxide, the ratio of the height ($H_{110}$) of a peak of (110) plane assigned to a crystal structure with space group C2/m to the height ($H_{003}$) of a peak of (003) plane assigned to a crystal structure with space group R-3m (i.e. $H_{110}/H_{003}$) is from 0.06 to 0.15.

2. The cathode active material according to claim 1, wherein in the lithium-containing composite oxide, by the molar ratio to the total molar amount (X) of Ni, Co and Mn, the Ni ratio (Ni/X) is from 0.15 to 0.55, the Co ratio (Co/X) is from 0 to 0.09, and the Mn ratio (Mn/X) is from 0.33 to 0.8.

3. The cathode active material according to claim 1, wherein the lithium-containing composite oxide is represented by the formula $aLi(Li_{1/3}Mn_{2/3})O_2 \cdot (1-a)LiNi_\alpha Co_\beta Mn_\gamma M'_\delta O_2$, wherein M' is at least one member selected from the group consisting of F, Mg, Al, Cr, Fe, Ti and Zr, "a" is more than 0 and less than 1, and $\alpha+\beta+\gamma+\delta=1$.

4. The cathode active material according to claim 1, wherein in an X-ray diffraction pattern of the lithium-containing composite oxide, the ratio of the minimum value at 2θ of from 20.8 deg to 21.5 deg to the maximum value at 2θ of from 21 deg to 22 deg (i.e. minimum value/maximum value) is at most 0.56.

5. The cathode active material according to claim 1, wherein the specific surface area of the cathode active material is from 0.1 to 10 $m^2/g$.

6. The cathode active material according to claim 1, wherein the average particle size (D50) of the cathode active material is from 3 to 30 μm.

7. The cathode active material according to claim 1, wherein in an X-ray diffraction pattern of the lithium-containing composite oxide, the crystallite diameter obtained by the Scherrer equation from a peak of (003) plane assigned to a crystal structure with space group R-3m is from 60 to 140 nm.

8. The cathode active material according to claim 1, wherein in an X-ray diffraction pattern of the lithium-containing composite oxide, the crystallite diameter obtained by the Scherrer equation from a peak of (110) plane assigned to a crystal structure with space group R-3m is from 30 to 90 nm.

9. A positive electrode for a lithium ion secondary battery, which comprises the cathode active material as defined in claim 1, an electrically conductive material and a binder.

10. A lithium ion secondary battery, which comprises the positive electrode for a lithium ion secondary battery as defined in claim 9, a negative electrode, a separator and a non-aqueous electrolyte.

11. The cathode active material according to claim 1, wherein in the formula, a is at least 0.5 and less than 1.

\* \* \* \* \*